Patented May 26, 1953

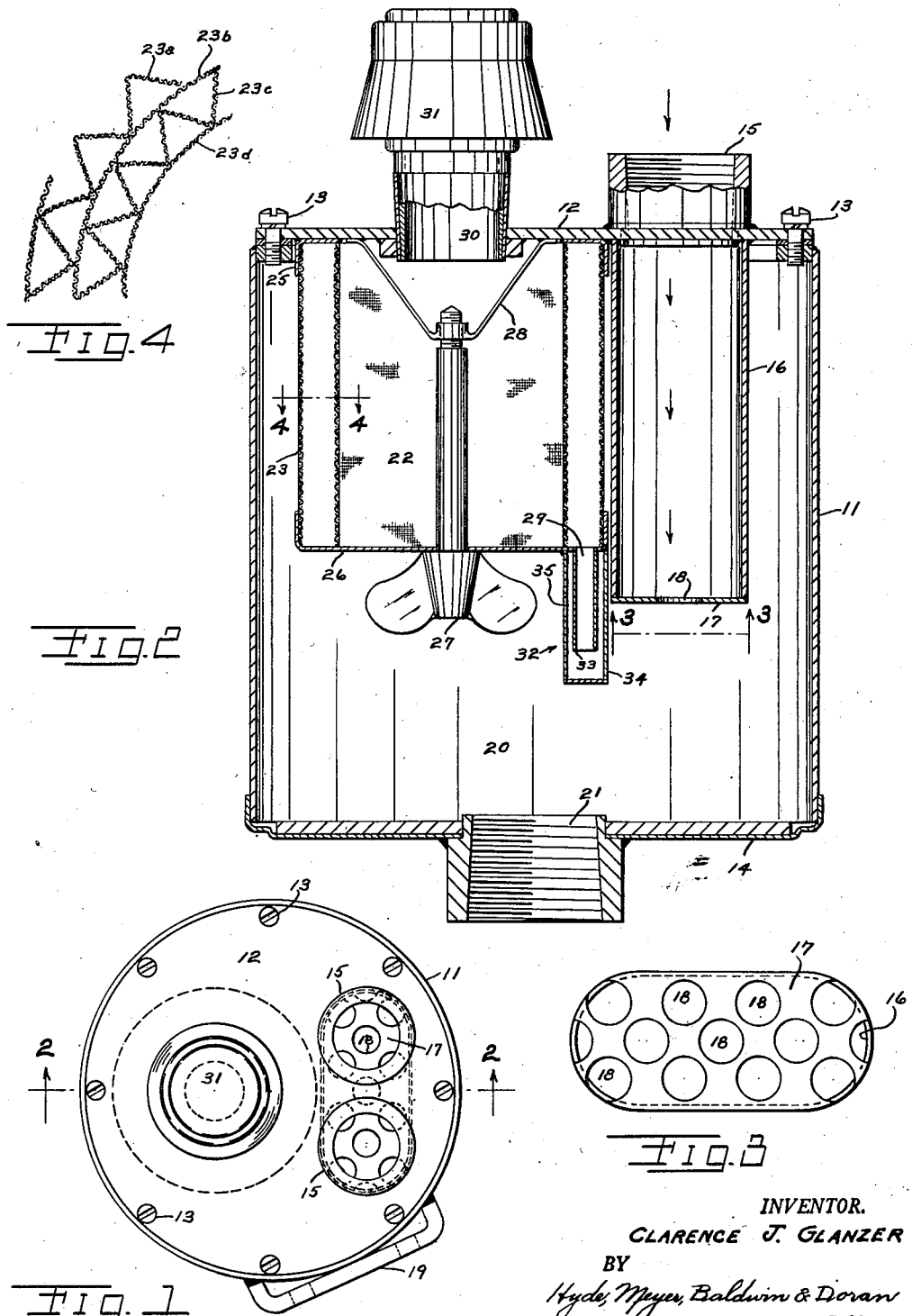

2,639,779

UNITED STATES PATENT OFFICE 2,639,779

DEAERATOR FOR OIL OR THE LIKE

Clarence J. Glanzer, Northfield, Ohio, assignor to Air-Maze Corporation, Cleveland, Ohio, a corporation of Delaware Application May 17, 1950, Serial No. 162,559

1 Claim. (Cl. 183—2.5)

This invention pertains to a device for separating entrapped air from oil or the like, and particularly contemplates such a device to be used on equipment where oil is supplied to bearings under pressure and circumstances whereby a certain volume of air becomes mixed with the oil. An example of this application occurs in a well-known turbo-charger wherein air under pressure slightly greater than that of the oil is allowed to seep past the bearings into the crankcase, thereby preventing any lubricating oil from entering the turbine housing. It is, of course, highly desirable to remove this air from the oil before it is recirculated.

An object of this invention is to provide a device which will quickly and efficiently separate entrapped air from oil or the like and is usable in applications such, for example, as that mentioned above.

Other objects, features, and advantages of the invention will become apparent from the following description taken in conjunction with the drawing of a preferred embodiment thereof, wherein, Fig. 1 is a top plan view, Fig. 2 is an enlarged vertical section taken on line 2—2 of Fig. 1, Fig. 3 is a view taken on line 3—3 of Fig. 2 and shows a perforated plate used in the preferred embodiment, and Fig. 4 is a section on line 4—4 of Fig. 2 enlarged and showing a portion of one embodiment of a foraminous filter unit.

Speaking first generally, the device comprises means for liberating entrapped air from the entering oil, and filter means to insure that no vaporous oil particles are carried out by the escaping air.

The various separating elements are contained within a cylindrical casing 11 having a top cover 12 removably secured as by bolts 13 and a permanently attached bottom cover 14. Bracket 19 is welded to casing 11 and is drilled for mounting purposes.

Welded through suitable apertures in top cover 12 are collars 15, internally threaded to receive the pipes bearing the air-laden oil. The collars 15 open into an inlet pipe 16 attached to and projecting inwardly from top cover 12, the lower end of which is closed by a separator plate 17 having perforations 18 therethrough. As will be hereinafter described, the perforated plate 17 serves as the separating element in this embodiment of my invention.

Attached to and projecting through bottom cover 14 is a collar 21 which is internally threaded to receive an outlet pipe (not shown). In the usual application, the outlet or drain pipe (belonging to the equipment with which the invention is used) leads to and is sealed into an oil sump. Thus, any free air in the interior chamber 20 of the device cannot escape through the drain pipe. Also, the drain pipe is of a greater cross-sectional area than the entering pipes so the oil level in chamber 20 will not build up.

Removably attached to top cover 12 is a filter unit by means of which oil vapor is removed from the escaping separated air. The foraminous filter unit 22 comprised of annular elements is held in position inside flange 25 by bottom cap 26 and thumb screw 27 threaded into bracket 28. Projecting through and attached to top cover 12, coaxially with foraminous unit 22, is an air outlet pipe 30 covered by a protective cap 31.

In operation, the air-carrying oil enters inlet pipe 16 and strikes perforated separator plate 17. There its flow is impeded, and as the oil stream divides to flow through the apertures 18, the majority of the bubbles are broken and the air released. Any air still remaining in the oil is freed when the many smaller streams emanating from the apertures 18 strike the bottom cover 14. The oil then flows out through the drain pipe to a sump from which it is recirculated.

As is readily understood by one skilled in the art, when the air is released from the oil by dashing against plate 17 and bottom 14, it contains some amount of oil vapor. This freed air cannot escape through the drain pipe as previously pointed out, and therefore it must pass through filter unit 22 in order to discharge through outlet pipe 30.

In order to remove substantially all entrained oil under these conditions, the invention takes advantage of the cohesive property of the entrained particles, and to this end the screen elements of which the foraminous unit is composed, may be of varying density so related that the succession of elements through which the stream flows, is one including a progression of decreasing density. In the example shown herein, two densities are employed, there being two elements of each density, and, these elements being of woven wire screen, the outer pair 23a, 23b, are of finer mesh than the inner pair 23c, 23d. Under the conditions described, I have successfully employed for the purpose rectangular mesh, 30 to the inch each way for the outer elements, and rectangular mesh, 18 to the inch each way for the inner elements, the wire of the screen being in the neighborhood of 0.01 of an inch diameter for each, slightly smaller for the finer screen and slightly larger for the coarser screen. As indicated in Fig. 4, the elements are arranged in pairs, one of each pair being smoothly cylindrical and having a complementary element crimped with longitudinally running deformations, the two elements of the pair being disposed immediately adjacent each other in contiguous concentric relation, with the crimped one radially outside the uncrimped one. In fact, all of the elements are disposed in layer relation, each bearing against the next to permit flow of oil over the surfaces of the wires of the screening of which the elements are formed. Such arrangement also provides compactness and rigidity for the unit.

The stream of vaporous oil laden air is first intercepted by the finer mesh screen element or elements which divide the main stream into very numerous minute ones. Most of the entrained oil particles deposit immediately upon the wires forming one or the other of these fine mesh screens, each particle cohering to the surface which it contacts. The mesh is so fine that entrained particles centrally disposed of one of these minute screens, are, in passing through the screen, caused to contact each other so that one large particle of oil may emerge from the first fine screen in place of an original number of fine particles. In such case the enlarged entrained particles will strike, and be retained by, the next screen.

The outermost screen 23a being crimped, although actually of the same fineness of the next screen 23b of its pair, is effectively a finer screen, owing to the oblique disposition of most of its parts with reference to the stream. Similarly, the intermediate crimped screen 23c is effectively coarser than the screen 23b and finer than the screen 23d, as well as forming a separator therebetween.

At any rate, the combined surface of the wires of the unit considered as a whole, soon becomes wetted in operation, the direction of the stream causing flow of this surface liquid in the direction radially inwardly of the unit. As flow is had of this liquid from one screen element to the next, as from the element 23c to the element 23d, the interstices of the screen element are effectively larger so that the gaseous flow has less effect upon the liquid upon the surface of the screen so that this liquid may flow downwardly of the screen under the action of gravity.

Thus, in general the liquid flow is formed from particles which have left the gaseous stream to form a surface skin which has movement radially inwardly of the unit and downwardly to the bottom of the unit. This liquid of course collects at the bottom of the housing where it drains off by way of the outlet 29.

Outlet 29 opens into a manometer seal 32 comprising an inner pipe 33 through which the drops of recovered oil flow and drop into outer pipe 34 which has a closed lower end. As this oil collects in pipe 34, the level rises until it reaches an aperture 35 located in the side of pipe 34 above the level of the bottom of pipe 33. Thus, the seal provides a path whereby the recovered liquid may be returned from the downstream to the upstream side of the filter and yet no air is allowed to traverse the seal in the reverse direction.

The preferred embodiment described herein has a foraminous filter unit of a particular design. However, it is to be understood that many other filters which will efficiently remove vapor from air can be used in the invention with but minor changes in mounting means.

It is also to be understood that the invention contemplates the use of separator plates other than the perforated plate shown and described herein. It is anticipated that air bubbles might well be freed by directing the oil stream against an imperforate plate having suitable flow directing means therewith. The invention requires an arrangement which will break up the air bubbles in the oil.

Various changes in details and arrangement of parts can be made by one skilled in the art without departing from the spirit of my invention or the scope of the appended claim.

What I claim is:

An oil and air separating device of the class described comprising a closed container having in the top thereof a liquid inlet and air escape means, an unobstructed liquid outlet in the bottom of said container and out of alinement with said inlet, a straight inlet pipe in said container arranged vertically in liquid-flow connection with said liquid inlet and terminating a substantial distance above the bottom of said container, said inlet pipe of sufficient extent to cause liquid from said inlet to be directed in a stream vertically downward, a perforate separator plate disposed adjacent the bottom end of said inlet pipe to be impinged by the inlet stream, said bottom of said container being impinged by streams passing through said separator plate, a screen mesh filter unit in said container attached to the top of said container and operatively associated with said air escape means whereby all air escaping through said air escape means must pass through and be filtered by said filter unit, and a manometer seal connected to and depending from said filter unit providing a liquid path from the downstream side of said filter unit to the upstream side thereof against a pressure differential, said liquid path being spaced from the path of the air and oil mixture flowing into said filter screen mesh.

CLARENCE J. GLANZER.

References Cited in the file of this patent

UNITED STATES PATENTS

| Number | Name | Date |
|---|---|---|
| 1,463,990 | Wilson | Aug. 7, 1923 |
| 1,581,371 | Weisgerber | Apr. 20, 1926 |
| 1,761,743 | Peterson | June 3, 1930 |
| 1,915,987 | Fisher et al. | June 27, 1933 |
| 2,354,722 | Walton | Aug. 1, 1944 |
| 2,514,623 | Brown | July 11, 1950 |